(12) United States Patent
Queck

(10) Patent No.: US 8,049,510 B2
(45) Date of Patent: Nov. 1, 2011

(54) METHOD FOR DETECTING A FAULT ON A DATA LINE

(75) Inventor: Matthias Queck, Neuhaus-Schiers (DE)

(73) Assignee: Lear Corporation GmbH, Ginsheim-Gustavsberg (DE)

( * ) Notice: Subject to any disclaimer, the term of this patent is extended or adjusted under 35 U.S.C. 154(b) by 236 days.

(21) Appl. No.: 12/502,482

(22) Filed: Jul. 14, 2009

(65) Prior Publication Data

US 2010/0017661 A1    Jan. 21, 2010

(30) Foreign Application Priority Data

Jul. 16, 2008  (DE) ......................... 10 2008 002 946

(51) Int. Cl.
  *G01R 31/08*  (2006.01)
(52) U.S. Cl. ...................... 324/522; 324/500; 324/76.11; 714/816; 714/819
(58) Field of Classification Search .................. None
  See application file for complete search history.

(56) References Cited

U.S. PATENT DOCUMENTS

| | | | |
|---|---|---|---|
| 5,784,285 A * | 7/1998 | Tamaki et al. | 702/66 |
| 5,793,780 A | 8/1998 | Strauss | |
| 6,781,456 B2 | 8/2004 | Pradhan | |
| 7,039,372 B1 * | 5/2006 | Sorrells et al. | 455/118 |
| 7,137,061 B2 | 11/2006 | Blank | |
| 7,437,934 B2 * | 10/2008 | Shoureshi | 73/643 |

FOREIGN PATENT DOCUMENTS

| | | |
|---|---|---|
| DE | 10 2006 048073 A1 | 4/2008 |
| EP | 18 20 303 B1 | 2/2009 |

* cited by examiner

*Primary Examiner* — Roberto Velez
*Assistant Examiner* — Trung Nguyen
(74) *Attorney, Agent, or Firm* — Brooks Kushman P.C.

(57) ABSTRACT

Multiple embodiments relate to a method for detecting a fault on a data line in a bus system in a two-line data network having at least two control units. A data signal is emitted by a transmitter-receiver unit on the two data lines as a differential voltage signal that includes a defined quiescent current. The data lines are mutually connected through a resistance bridge for detecting the middle voltage. The middle voltage is detected directly by a microcontroller after a low-pass filter or as a digital value after an analog-to-digital conversion. The result is displayed and/or stored. A circuit arrangement for implementing the method is also provided.

20 Claims, 1 Drawing Sheet

METHOD FOR DETECTING A FAULT ON A DATA LINE

CROSS-REFERENCE TO RELATED APPLICATIONS

This application claims foreign priority benefits under 35 U.S.C. §119(a)-(d) to DE 10 2008 002 946.7, filed Jul. 16, 2008, which is hereby incorporated by reference in its entirety.

BACKGROUND

1. Technical Field

The multiple embodiments disclosed herein relate to a method for detecting a fault on a data line in a bus system in a two-conductor data network having at least two control units.

2. Background Art

In the case of such two-wire data buses, such as a CAN-Bus (derived from Control Area Network), for which the properties are specified in ISO 11898, individual data bits are transmitted differentially on the two lines of the bus. In a quiescent state, both lines of the bus have about the same potential, since the two lines are coupled to one another through a terminating resistor. A dominant bit is actively transmitted from a transmitter on the bus by enabling a driver current. This transmission occurs differentially, which means that the potential of one line of the bus is raised and the potential of the other line of the bus is lowered. A recessive bit is transmitted by a transmitter by turning off the driver current. In the following discussion, we assume that the two bus lines remain at approximately the same potential.

Different kinds of errors can occur in data buses of this type. Short circuits can arise in the individual conductors with respect to a reference potential and also with respect to one another. DE 100 59 769 A1 discloses that known circuit arrangements analyze the potentials of the conductors and attempt to infer whether such short circuits are present.

In a circuit element known from U.S. Pat. No. 5,488,306, the difference in potentials of the two bus lines is also evaluated. A concrete example of a circuit is presented in this publication that allows for definite error recognition to occur without reacting to ground offsets of the bus conductors resulting from error recognition by differential current measurement and not by voltage measurement.

A method for detecting the ground offsets of portions of a network system is disclosed in DE 102 25 556 A1, in particular for testing the ground contact between networked control units, wherein data are sent and received through at least one bus system. Thus, in the quiescent state of at least one bus conductor provided for receiving the data or at least one receiver line, the voltage is sampled after the passage of a specifiable first time interval and is compared with at least one specifiable threshold or reference potential value. If the threshold value is exceeded, it then produces a ground fault signal by which the quiescent state of the at least one bus conductor is evaluated. The circuit is relatively complex and complicated, and thus expensive.

An important requirement for high-speed CAN systems in motor vehicles is the diagnosis of the conductor lines, which also results from the previously mentioned documents. The prevalent solutions consist in that a diagnosis is carried out in integrated circuits, namely in central interface modules. Such interface modules are relatively expensive. The high speed TJA1041A and TJA1040-CAN-transceivers are cited for example. It is obvious from the specification sheets for these integrated circuits that two resistors (each 60Ω) are connected between the data lines such that their connection point to ground is switched through a condenser and connected with an input of the transceiver. Stabilization is to be achieved in this manner.

SUMMARY

Starting from the known prior art, the multiple embodiments disclosed herein are based on achieving a particularly simply designed method, and providing a particularly simple and cheap circuit in order to be able to carry out a fault diagnosis of the conductor lines without having to resort to integrated solutions. Furthermore, a desirable objective is to be able to carry out an especially simple evaluation on each bus or line of buses of a two-wire data bus.

According to teachings of the method according to claim 1, it is provided that the middle voltage tapped by the resistance bridge between the two conductors is first subjected to a low-pass filter, and that the output voltage is detected directly or after an analog-to-digital conversion as the digital value of a microcontroller. An optical or acoustic display, at least of the fault diagnosis, is implemented subject to the detection, and/or an error signal is generated that is stored so that it can be queried, for instance by means of a remote diagnostic system. Likewise, a control signal can also be generated in order to be able to produce output control functions, for example, in case of failure of a bus of the microcontroller, e.g., switching off additional functional groups. The microcontroller furthermore determines whether one of the two data lines is affected by a frame fault, ground fault, a mutual connection, or a connection with a power supply source. This takes place completely independently of the operation of the transmitter-receiver circuit, or transceiver, and can occur at any point in the bus.

As is well known, in a CAN-Bus there is a plurality of participating stations, e.g., machine-controlled devices, non-hierarchical control units. The data can thereby be transmitted through a star-shaped bus to the individual stations. Addressing of the data is message-related and not station-related. All stations thus receive the data. The data can also be transmitted through a serial type bus. The measurement method can be used in both cases. When the data are transmitted and no faults are present, and thus no short circuit is present, high voltages of nearly the same magnitude are applied to both conductors, so that, with respect to a CAN-Bus for example, 2.5V can be applied and evaluated at the center tap of the resistance bridge. When a fault occurs on one of the two conductors, for example a short circuit at any terminal, a ground connection, or a connection of both the lines, or a connection with the battery, then the middle voltage either increases or decreases, thus deviating from the ideal value (middle value). After filtering the tapped voltage through a low-pass filter, this voltage is evaluated by the microcontroller. This can occur by direct input of the analog voltage, but also after the digital conversion through a suitable digital value. The nominal voltage at the center tap of the resistance bridge, which is furthermore connected to ground through a condenser, is e.g., 2.5V. When a fault appears in one of the two data lines, the voltage will rise to a higher value or drop to a lower value. This deviation can be evaluated directly. For example, the following evaluations are possible:

CAN_L connection to ground: $U_{mean} < 2.5V$
CAN_L connection between the conductors: $U_{mean} > 2.5V$
CAN_L connection to the power supply: $U_{mean} > 2.5V$
CAN_H connection to ground: $U_{mean} < 2.5V$ CAN_H connection between the conductors: $U_{mean}>2.5V$
CAN_H connection to the power supply: $U_{mean}>2.5V$ The microcontroller can display the error condition following the evaluation, or can also store it in memory, for example by investigating breakdowns and malfunctions with remote diagnostic techniques. The microcontroller also simultaneously controls the transceiver that emits the data signals to the CAN_H line and the CAN_L line.

Voltage tables are stored in the microcontroller, which are assigned to the respective fault conditions with the aid of the foregoing interpretation. This method can in principle be adapted to all bus systems that operate with differential data transfer. A circuit is indicated for performing the method, which is characterized by both data lines being connected to one another through a resistance bridge, that a condenser is connected with the center tap and to ground, and that a low-pass filter is connected with the center tap, the output voltage of which is applied directly or following analog-to-digital conversion as a digital value at the measurement input of a microcontroller, which evaluates the input variables by means of a recorded program or through a controlled output value circuit, and in case of a short circuit signals a ground connection or an impermissible connection to a current-carrying conductor by optical and/or acoustic means, and/or records it in a readable memory.

It is furthermore advantageous to locate the measurement circuit between the CAN_H- and CAN_L-terminals ahead of the transmitter-receiver unit of the CAN-bus system, in order that the measurement circuit lines not become too long. If a star-shaped system is used, a plurality of such measurement bridges can be activated and connected with the microcontroller, or can be connected with individual microcontrollers that communicate with one another. A microcontroller can also be integrated into a control device, which can also have a transmitter-receiver unit. In this combination the simplicity of the circuit and evaluation offers advantages. The resistances of the measurement bridges can be arranged symmetrically and can have values between $4\Omega$ and $50\ k\Omega$, for example, this depends respectively on the desired and necessary measurement voltage that is to be evaluated, and on the system.

DETAILED DESCRIPTION OF EMBODIMENTS

Figure 1:
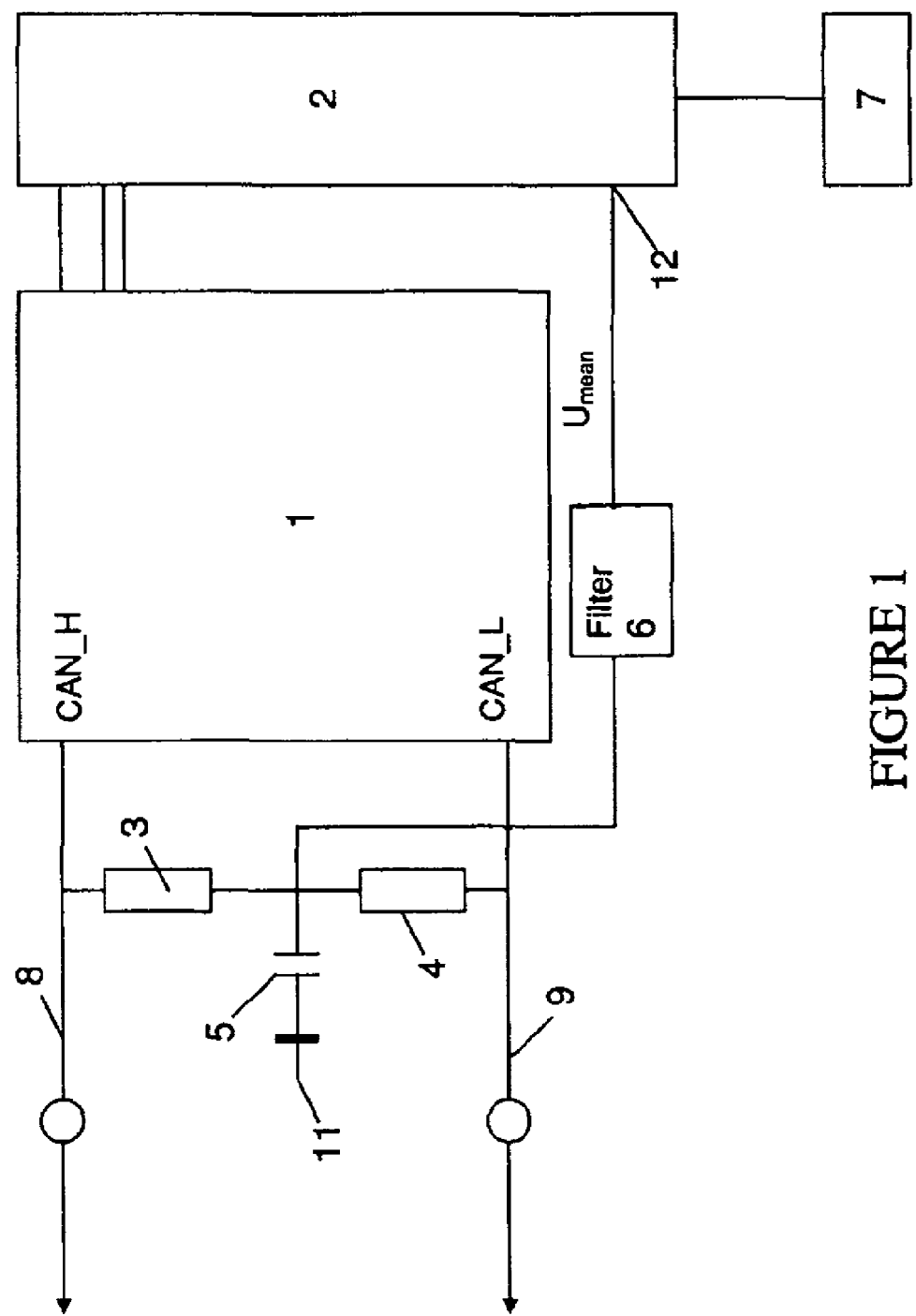
FIG. 1 is a circuit diagram.

Multiple embodiments will now be described in detail with the aid of the circuit shown in the single drawing, FIG. 1.

The circuit depicts an assembly of a CAN-bus system having a two-wire data bus consisting of the data lines 8, 9. The CAN_H-signal is transmitted through the data line 8, and the CAN_L-signal through data line 9, which is generated by the transmitter-receiver unit 1 and the transceiver following control by means of the attached microcontroller 2. The message-related CAN-bus transmits the data on the basis of the CAN-protocol and has two bit states for the bus assignment. The bit state is either recessive or dominant. If a dominant bit is transmitted, then recessive bits sent by the other stations are overwritten. If the identifier of the message is recorded in the identifier list, this message is accepted. The data frame consists of seven CAN-fields.

Start marks the beginning of a message and synchronizes all stations. The arbitration field produced by the bus assignment consists of a message identifier. During the transmission of this field, the transmitter checks with each bit whether it is still authorized to transmit, or whether a message with higher priority is being sent by another transmitter. The transmission and the data itself are not relevant to the invention, however, and will thus not be mentioned further. Concerning the data that is to be transmitted differentially, as already remarked, the voltage increases or drops to the other data line. However, the middle voltage remains relatively constant, as the quiescent voltage, so that a voltage $U_{mean}$ is tapped by the tap 10 of the measurement bridge from the resistances 3, 4 in the normal operating state that has previously passed through a low-pass filter, which does not lead to an evaluation by the microcontroller 2. A smoothing condenser 5 is furthermore connected between the tap 10 of the measurement bridge and ground.

However, when a disturbance or fault occurs on one of the two conductors, e.g., a short circuit, a connection between the two conductors 8 and 9, a ground connection, or a connection to the power supply source, then the potential is significantly displaced.

The microcontroller then evaluates this potential, e.g., by consulting a table or by comparing with a reference voltage. Thus, when errors occur, which are indicated as follows:
CAN_L connection to ground: $U_{mean}<2.5V$
CAN_L connection between the conductors: $U_{mean}>2.5V$
CAN_L connection to the power supply: $U_{mean}>2.5V$
CAN_H connection to ground: $U_{mean}<2.5V$
CAN_H connection between the conductors: $U_{mean}>2.5V$
CAN_H connection to the power supply: $U_{mean}>2.5V$ The voltage values that are apparent from the table are shown, which are evaluated by the microcontroller 2, stored and/or routed to a display unit 7 that signals whether a fault is present or not.

What is claimed:

1. A method for detecting a fault in a data line in a bus system in a two-conductor data network having at least two control units, the method comprising:
    transmitting a data signal from a transmitter-receiver unit to two data lines as a differential voltage signal incorporating a defined quiescent current, the two data lines being connected with one another through a resistance bridge for determining the middle voltage such that the middle voltage is detected at least following an analog-to-digital conversion as a digital value by a microcontroller, and at least one of the following occurs:
        one of an optical display and an acoustic display results, at least one of a fault diagnosis and a generated error signal is stored, and control signals are generated; and
    determining by the microcontroller whether one of the two data lines has at least one of a ground connection, a connection therebetween, and a short circuit with a power supply source.

2. The method of claim 1 further comprising displaying an associated state value on the microcontroller via a look up table that is readably stored in a memory unit.

3. The method of claim 1 wherein the method is used in at least one of a CAN-bus, a Flexray-bus, and a differential data transmission based bus system.

4. A circuit arrangement for implementing the method of claim 1 wherein both data lines are connected with one another through a resistance bridge, the circuit arrangement comprising:
    a condenser connected a center tap and connected to ground; and
    a low-pass filter connected with the center tap, for which the output voltage is one of applied directly and a digital value to a measurement input of the microcontroller following an analog-to-digital conversion, which evaluates the input variables with one of a stored program, a controlled evaluation circuit, in case of a short circuit, a ground connection, and an impermissible connection to a current-carrying conductor, such that at least one of an optical signal and an acoustical signal signals the fault in a readable memory unit.

5. The circuit arrangement of claim 4 wherein the measurement circuit between a CAN_H- and a CAN_L-connection is provided ahead of a transmitter-receiver unit of a CAN-bus system.

6. The circuit arrangement of claim 4 wherein a measurement circuit is provided for a star type arrangement of a plurality of data lines in each branch.

7. The circuit arrangement of claim 4 wherein at least one control unit contains the microcontroller for evaluation, and at least one measurement input is provided thereon.

8. The circuit arrangement of claim 4 wherein the measurement circuit has at least one of two symmetrical resistances and one resistance arrangement, such that resistance values of each partial branch lies between 4Ω and 50 kΩ.

9. A method for detecting a fault in a two-conductor data network, the method comprising:
transmitting a data signal from a transmitter-receiver unit to two data lines as a differential voltage signal, the two data lines being connected with one another through a resistance bridge for providing a middle voltage based on the differential voltage signal;
converting, at a microcontroller, the middle voltage from an analog value to a digital value to generate a digital middle voltage;
comparing the digital middle voltage to a predetermined voltage;
determining that a fault condition is present in the network if the digital middle voltage is not equal to the predetermined voltage; and
performing at least one of:
visually displaying a fault condition in the event the digital middle voltage is not equal to the predetermined voltage; and
generating an audible signal indicative of the fault condition in the event the digital middle voltage is not equal to the predetermined voltage.

10. The method of claim 9 further comprising stabilizing the middle voltage via a capacitor prior to converting, at the microcontroller, the middle voltage.

11. The method of claim 10 further comprising filtering the middle voltage via a filter prior to converting, at the microcontroller, the middle voltage.

12. The method of claim 9 wherein the predetermined voltage is substantially equal to 2.5 volts.

13. The method of claim 9 further comprising determining that the fault condition corresponds to a short to ground condition for at least one of the two data lines in the event the digital middle voltage is less than the predetermined voltage.

14. The method of claim 13 further comprising determining that the fault condition corresponds to a short to battery condition for at least one of the two data lines in the event the digital middle voltage is greater than the predetermined voltage.

15. An apparatus for detecting a fault in a two-conductor data network, the apparatus comprising:
a microcontroller for being operably coupled to a transmitter-receiving unit that transmits a data signal over two data lines as a differential voltage, the two data lines being connected to one another through a resistance bridge that provides a middle voltage based on the differential voltage, the microcontroller being configured to:
convert the middle voltage from an analog value to a digital value to generate a digital middle voltage;
compare the digital middle voltage to a predetermined voltage;
determine that a fault condition is present in the network if the digital middle voltage is not equal to the predetermined voltage; and
transmit an error signal such that at least one of a display indicates the presence of the fault condition in the event the digital middle voltage is not equal to the predetermined voltage and an audible signal is transmitted indicative of the presence of the fault condition in the event the digital middle voltage is not equal to the predetermined voltage.

16. The apparatus of claim 15 wherein the microcontroller is further configured to determine that the fault condition corresponds to a short to ground condition for at least one of the two data lines in the event the digital middle voltage is less than the predetermined voltage.

17. The apparatus of claim 15 wherein the microcontroller is further configured to determine that the fault condition corresponds to a short to battery condition for at least one of the two data lines in the event the digital middle voltage is greater than the predetermined voltage.

18. The apparatus of claim 15 wherein the resistance bridge is operably coupled to a capacitor for stabilizing the middle voltage prior to the microcontroller converting the middle voltage from the analog value to the digital value.

19. The apparatus of claim 18 wherein the microcontroller is operably coupled to a filter for filtering the middle voltage prior to the microcontroller converting the middle voltage from the analog value to the digital value.

20. The apparatus of claim 15 wherein the predetermined voltage is substantially equal to 2.5 volts.

* * * * *